US011127131B1

(12) United States Patent
Thomas et al.

(10) Patent No.: US 11,127,131 B1
(45) Date of Patent: Sep. 21, 2021

(54) SYSTEMS AND METHODS TO ASSESS ABILITIES OF TWO OR MORE INDIVIDUALS TO PERFORM COLLECTIVE PHYSICAL ACTS

(71) Applicants: Marc Michael Thomas, Mokelumne Hill, CA (US); Alexander Paul Barangan, Felton, CA (US); Nelson George Publicover, Bellingham, WA (US)

(72) Inventors: Marc Michael Thomas, Mokelumne Hill, CA (US); Alexander Paul Barangan, Felton, CA (US); Nelson George Publicover, Bellingham, WA (US)

( * ) Notice: Subject to any disclaimer, the term of this patent is extended or adjusted under 35 U.S.C. 154(b) by 0 days.

(21) Appl. No.: 17/182,036

(22) Filed: Feb. 22, 2021

(51) Int. Cl.
*G06T 7/00* (2017.01)
*G06T 7/60* (2017.01)
(Continued)

(52) U.S. Cl.
CPC ........ *G06T 7/0002* (2013.01); *G06K 9/00362* (2013.01); *G06K 9/627* (2013.01);
(Continued)

(58) Field of Classification Search
CPC ........... G06T 7/0002; G06T 7/60; G06T 7/97; G06T 2207/20084; G06T 2207/30196;
(Continued)

(56) References Cited

U.S. PATENT DOCUMENTS

| 7,194,327 B2 * | 3/2007 | Lam ...................... A41H 3/007 341/87 |
| 8,010,402 B1 * | 8/2011 | Sharma .................. G06Q 10/00 705/7.29 |

(Continued)

OTHER PUBLICATIONS

Yan, Y., et al., "Predicting Human Interaction via Relative Attention Model," Proceedings of the Twenty-Sixth International Joint Conference on Artificial Intelligence (IJCAI-17), Aug. 2017.*
(Continued)

*Primary Examiner* — Xuemei G Chen
(74) *Attorney, Agent, or Firm* — William A. English; Vista IP Law Group LLP

(57) ABSTRACT

Systems and methods are described for measuring, using one or more cameras, anthropomorphic features of two or more individuals to classify and/or grade whether the two or more individuals possess physical abilities to collectively perform desired physical acts, actions or activities. The performance of such actions may involve objects with measured or known dimensions, and/or one or more assistive devices to compensate for differences in anthropomorphic features. Anthropomorphic features of the two or more individuals may also be projected into the future based on attributes such as ages, medical conditions, activity levels and predispositions. Classification schemes may use neural network-based approaches and/or statistical methods based on labelled datasets of abilities of two or more individuals with given anthropomorphic features to perform selected actions.

20 Claims, 8 Drawing Sheets

(51) Int. Cl.
*G06K 9/62* (2006.01)
*G06K 9/00* (2006.01)
*G06N 3/04* (2006.01)
*G06N 3/08* (2006.01)

(52) U.S. Cl.
CPC ......... *G06K 9/6256* (2013.01); *G06N 3/0454* (2013.01); *G06N 3/08* (2013.01); *G06T 7/60* (2013.01); *G06T 7/97* (2017.01); *G06T 2207/20081* (2013.01); *G06T 2207/20084* (2013.01); *G06T 2207/30196* (2013.01)

(58) Field of Classification Search
CPC ............ G06T 2207/20081; G06N 3/08; G06N 3/0454; G06K 9/6256; G06K 9/627; G06K 9/00362
See application file for complete search history.

(56) References Cited

U.S. PATENT DOCUMENTS

| | | | | |
|---|---|---|---|---|
| 9,132,352 | B1* | 9/2015 | Rabin | A63F 13/57 |
| 10,176,725 | B2* | 1/2019 | Fischer | G09B 19/00 |
| 10,762,414 | B1* | 9/2020 | Marggraff | G06N 99/00 |
| 10,937,173 | B2* | 3/2021 | Ali Akbarian | G06N 5/046 |
| 10,949,656 | B2* | 3/2021 | Aoki | G06K 9/00805 |
| 2004/0179736 | A1* | 9/2004 | Yin | G06K 9/2018 |
| | | | | 382/191 |
| 2010/0198374 | A1* | 8/2010 | Carson | G06Q 10/00 |
| | | | | 700/90 |
| 2014/0377727 | A1* | 12/2014 | Yom-Tov | G06F 16/951 |
| | | | | 434/236 |
| 2016/0274649 | A1* | 9/2016 | Su | G06F 1/3265 |
| 2017/0177073 | A1* | 6/2017 | Mason | G06F 3/017 |
| 2018/0012376 | A1* | 1/2018 | Dayal | H04N 5/232 |
| 2018/0089519 | A1* | 3/2018 | Raziel | G06K 9/00892 |
| 2018/0107687 | A1* | 4/2018 | Tanigawa | G06K 9/00771 |
| 2019/0012574 | A1* | 1/2019 | Anthony | G05D 1/0088 |
| 2019/0250773 | A1* | 8/2019 | Miyaki | A63F 13/212 |
| 2019/0371149 | A1* | 12/2019 | Kim | G08B 21/0233 |
| 2020/0004877 | A1* | 1/2020 | Ghafourifar | H04L 67/306 |
| 2020/0085348 | A1* | 3/2020 | Lillie | A61B 5/486 |
| 2020/0180647 | A1* | 6/2020 | Anthony | G08G 1/0145 |
| 2020/0210507 | A1* | 7/2020 | Jacob | G06Q 50/01 |
| 2020/0226357 | A1* | 7/2020 | Protter | G06T 7/277 |
| 2020/0390371 | A1* | 12/2020 | Kim | A61B 5/0077 |
| 2021/0158029 | A1* | 5/2021 | Kimura | G06T 7/50 |
| 2021/0166009 | A1* | 6/2021 | Sun | G06K 9/46 |
| 2021/0182604 | A1* | 6/2021 | Anthony | G06K 9/00805 |

OTHER PUBLICATIONS

Vondrick, C., et al., "Anticipating Visual Representations from Unlabeled Video," 2016 IEEE Conference on Computer Vision and Pattern Recognition, Jun. 2016.*

* cited by examiner

SYSTEMS AND METHODS TO ASSESS ABILITIES OF TWO OR MORE INDIVIDUALS TO PERFORM COLLECTIVE PHYSICAL ACTS

FIELD OF THE INVENTION

The present invention relates generally to systems and methods to assess and/or classify whether two or more individuals possess physical abilities to collectively perform desired acts, actions or activities. Systems utilize techniques with the fields of computer vision and computer programming to measure physical dimensions of human anatomical components and optionally, one or more objects used to perform desired actions. Classification schemes may use statistical methods and/or neural network-based approaches based on labelled datasets of abilities of two or more individuals with given anthropomorphic features to perform selected physical acts. Methods may engage techniques within the field of human factors and/or human performance to assess abilities to perform desired acts. The systems may also use methods within gerontology and related fields involved with human development to project future capabilities of individuals to collectively perform such actions.

BACKGROUND

Anthropometry has a long and sometimes controversial history, involving the study of physical dimensions and proportions of anatomical components that make up the human body. Human features vary significantly across different populations as a result of a wide range of genetic, biological and environment influences. Human features and their relative proportions also vary as a function of a range of individual factors such as disease, diet, gender, and age where, for example, most females stop growing at around fifteen to eighteen (15-18) years of age whereas most males stop growing at around eighteen to twenty (18-20) years.

Anthropometry has been applied in a number of fields including forensics, ergonomic design, fashion design, art, and medicine. Medical anthropometry frequently involves the use of high-resolution, 3-dimensional scanning devices to, for example, help to fit prosthetic devices, ascertain and monitor various medical conditions, evaluate growth over time, and ascertain the results of altering dietary intake. Medical anthropometry, coupled with other forms of medical imaging and autopsy analyses, has also provided relationships between observable physical human features that may be measured non-invasively (e.g., using devices ranging from 3-dimensional scanners to simple cameras) compared with internal features such as sizes of individual bones, locations of various pivot structures involved in movements (e.g., shoulder, pelvis), variations in internal structures that result in or from disabilities, and so on. A related scientific field, kinesiology, involves the study of human (and nonhuman) body movements. Kinesiology combines physiology and biomechanics to apply dynamic principles to describe, monitor, and influence body movements. Licensing and sub disciplines covered by kinesiologists vary somewhat throughout the world, but such studies of human movement have been applied to individual ergonomics, clinical rehabilitation, exercise physiology, and athletic training.

The musculoskeletal features of an individual may be combined with the movement physiology of simple pairs of usually opposing muscles (i.e., flexion versus extension, abduction versus adduction, elevation versus depression, rotation, circumduction) to produce motions of body parts. Combinations of such usually opposing movements facilitates an individual's performing most activities involved in daily life. When performing such activities, video cameras may provide convenient, non-invasive tools to assess abilities of individuals to perform desired movements.

Devices that include cameras (e.g., mobile phones, tablets, laptop computers) have become ubiquitous in modern society. Such cameras are generally designed to be easy-to-use (e.g. including auto-focus, automatic compensation for varying light conditions) and to acquire images over a wide range of size scales, from the size of an entire human body to the tip of a finger. Many modern-day cameras include an ability to measure, or at least estimate, distances to objects within images. Knowing such distances coupled with camera specifications including sensor size and real (i.e., not "equivalent") focal length, it is possible to measure the dimensions of objects (e.g., human body parts) within acquired images. Many modern-day cameras and/or camera interfaces even include abilities to accelerate the processing of images using dedicated hardware.

An aspect of the present invention relates to projecting physical growth patterns and mechanical performances of two or more individuals to a future time. Gerontology is a relatively new scientific discipline that involves the study of the biological (as well as social, psychological and cognitive) aspects of aging. Such studies document, for example, aspects of gender differences including activity levels, physical performance, and life expectancy as a function of age. The field also includes studies of factors that contribute to decreased performance as a function of age and, on the other hand, aspects that contribute to prolonged healthy and active lifestyles.

There are a number of additional medical specialties in which prospective growth patterns at various ages are utilized. For example, standard growth charts for children including those of various ethnicities, the effects of prenatal and pediatric medications, and the prevention of vitamin/mineral deficiencies are examples of commonly used norms during assessments and clinical monitoring of children's growth. The consequences of exercise, diet, smoking, and drug use are examples where effects on the physique of the adult human body have been studied extensively. The field of gerontology includes a number of theories (e.g., so-called wear and tear, free radicals, DNA damage) regarding the effects of aging on body physiques as well as declining abilities to physically perform activities in the elderly.

Traditionally, both anthropometry and kinesiology have been applied at the level of individuals (e.g., to monitor medical conditions) or large populations (e.g., epidemiological studies of the effects of diet on body height and/or weight gain). If made convenient and applied to two (or more) individuals, the development of "multi-person digital anthropometry" coupled to principles used within kinesiology and gerontology could prospectively assess abilities to physically perform collective actions by two or more individuals, potentially affecting decision-making for life-long relationships.

SUMMARY

In view of the foregoing, systems and methods are provided herein for classifying, using one or more images of two or more individuals, degrees of physical compatibility to collectively perform desired physical acts, actions, or activities. Digital images of an individual may be used to make a number of physical measurements such as overall body height, waist circumference, lengths of arms, lengths of legs, and so on. Such direct measurements may also be used to compute derived measures (e.g., body weight, center of gravity, location of genitals, arm extension) to help further grade degrees of physical compatibility. Based on such direct and derived measures, statistical approaches and/or neural network-based classification schemes may be used to assess or grade an ability of the two or more individuals to collectively perform desired physical acts.

In addition to classifying or grading the current ability of the two or more individuals to perform selected acts, methods are provided in which estimates are made of physical features of the two or more individuals, projected to one or more selected future times. Changes in the physical features of the two or more individuals may be estimated based on factors such as projected growth, a presence of one or more medical conditions affecting overall growth and/or growth patterns, family history, and so on. Such projected human features may provide an assessment of whether two or more individuals may be able to perform physical acts at times in the future and/or estimates of when individuals may no longer be able to physically perform specific actions.

In further exemplary embodiments, the utility and/or effectiveness of assistive devices may additionally be considered in assessing degrees to which two or more individuals may perform desired physical acts. Assistive devices may compensate for measured and/or projected differences in one or more human anatomical features between the two or more individuals. Individual assistive devices may enable two or more individuals to perform a wide range of physical activities more effectively, more comfortably and/or over an extended period of time.

Two or more individuals (with or without assistive devices) may also perform acts that involve collective physical objects such as a wheelchair, table, bed, and so on. In these cases, the dimensions and other properties of the object(s) may play a role in the abilities of the two or more individuals to perform desired acts or activities. Dimensions may be acquired based on one or more images of the object, physical measurements and/or, in the case of identifiable manufactured objects, retrieved manufacturer's specifications. Classifications or assessments may be made to determine whether physical acts may be performed that involve a given object, and/or whether changes to the dimensions or other characteristics of an object may allow or optimize an ability of the two or more individuals to perform desired actions.

In accordance with an exemplary embodiment, a method is provided to assess physical compatibility between two or more humans that comprises acquiring, using one or more cameras and one or more processors, one or more first images of a first human; determining, from the one or more first images and using the one or more processors, one or more first human feature measurements; acquiring, using the one or more cameras and the one or more processors, one or more second images of a second human; determining, from the one or more second images and using the one or more processors, one or more second human feature measurements; and classifying, from comparisons between the one or more first human feature measurements and the one or more second human feature measurements and using the one or more processors, a collective ability of the first human and the second human to perform a physical act.

In accordance with another exemplary embodiment, a method is provided to assess physical compatibility between two or more humans that comprises acquiring, using one or more cameras and one or more processors, one or more first images of a first human; determining, from the one or more first images and using the one or more processors, one or more first human feature measurements; computing, using the one or more first human feature measurements and first human attributes and using the one or more processors, one or more future first human feature measurements; acquiring, using the one or more cameras and the one or more processors, one or more second images of a second human; determining, from the one or more second images and using the one or more processors, one or more second human feature measurements; computing, using the one or more second human feature measurements and second human attributes and using the one or more processors, one or more future second human feature measurements; and classifying, from comparisons between the one or more future first human feature measurements and the one or more future second human feature measurements and using the one or more processors, a future collective ability of the first human and the second human to perform a physical act.

In accordance with yet another exemplary embodiment, a method is provided to assess physical compatibility between two or more humans and an object that comprises acquiring, using one or more cameras and one or more processors, one or more first images of a first human; determining, from the one or more first images and using the one or more processors, one or more first human feature measurements; acquiring, using the one or more cameras and the one or more processors, one or more second images of a second human; determining, from the one or more second images and using the one or more processors, one or more second human feature measurements; computing, from the one or more first human feature measurements and the one or more second human feature measurements and using the one or more processors, combined human feature measurements; and classifying, from comparisons among the combined human feature measurements and one or more databases of feature measurements of an object and using the one or more processors, a collective ability of the first human and the second human to perform a physical act involving the object.

Other aspects and features including the need for and use of the present invention will become apparent from consideration of the following description taken in conjunction with the accompanying drawings.

BRIEF DESCRIPTION OF THE DRAWINGS

A more complete understanding of the present invention may be derived by referring to the Detailed Description of the Exemplary Embodiments when considered in connection with the following illustrative figures. In the figures, like-reference numbers refer to like-elements or acts throughout the figures. Presented exemplary embodiments are illustrated in the accompanying drawings, in which.

DETAILED DESCRIPTION OF THE EXEMPLARY EMBODIMENTS

Figure 1:
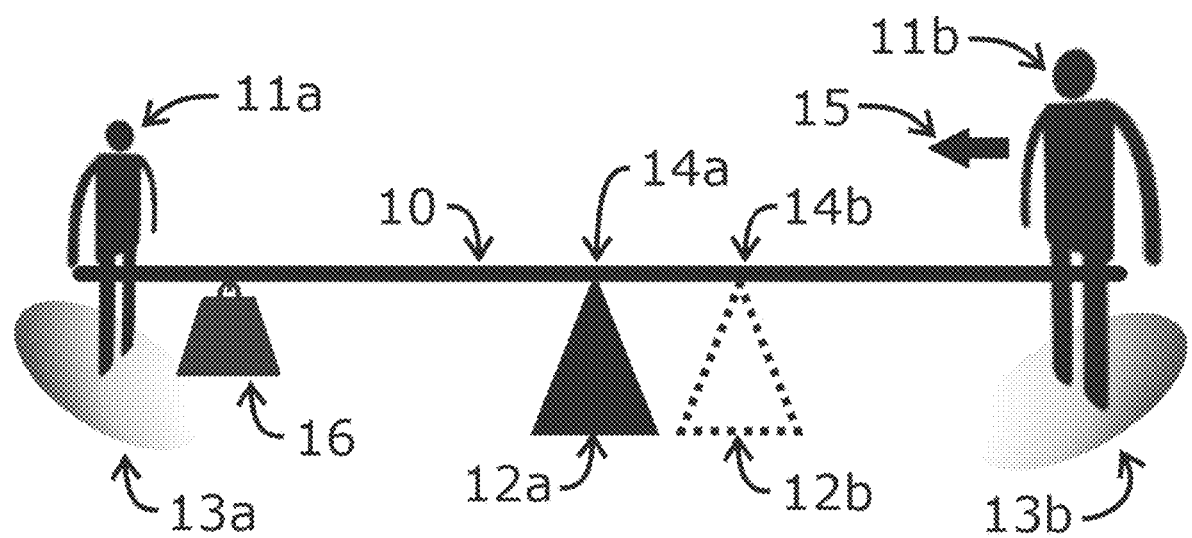
FIG. 1 demonstrates operation of a teeter totter, illustrating some key aspects and considerations within determinations whether two individuals can collectively perform physical activities.

In exemplary embodiments, an aspect of the present invention includes classifying, using one or more camera-based images of two or more individuals, degrees of physical compatibility to collectively perform desired physical acts, actions or activities. Classifications may be based on anatomical measurements that may be directly viewed within camera images, and/or derived or "indirect" measurements. Based on such direct and indirect measures, statistical approaches and/or neural network-based classification schemes may be used to assess or grade an ability of the two or more individuals to collectively perform desired physical acts.

In further exemplary embodiments, indirect measurements may be estimated based on the directly observable features coupled with norms for human anatomical forms and physiological performance. For example, if only a facial view of a head is available within camera images, the depth, size and weight of the viewed head may be estimated based on typical and/or average three-dimensional anatomies of heads utilizing viewable features (e.g., sized according to the view of the face) and density of materials that make up head structures. Optionally, one or more attributes (e.g., age, weight, smoker versus non-smoker, ethnic origin) of the one or more individuals may also be considered in computing such derived measures.

Another aspect of computing anatomical measurements that may not be directly observable within camera images involves taking into account clothing. Anthropometric measures may be determined from images with any degree of clothing including fully clothed, partially clothed (e.g., wearing a bathing suit or underwear) and/or not clothed. Images may be processed to recognize the presence of clothing and to take into account effects of particularly heavy clothing on measurements of foundational anatomical features. Such processes may include subtracting the thickness of recognized clothing elements and/or the presence of padding within clothing from camera image-based estimates of the dimensions of human anatomical features.

Examples of anthropomorphic features that may be determined using camera-based images include one or more of an overall body height, distances from hands to ground, distances from a crotch to ground, distances from a crotch to knees, distances from a crotch to eyes, distances from eyes to a nose, circumference of a mouth, distances from a crotch to breasts, a bust circumference, distances from knees to ground, distances from knees to ankles, distances from hips to knees, distances from shoulders to elbows, distances from elbows to wrists, a torso length, distances from eyes to a mouth, circumferences of hands, circumferences of wrists, circumferences of fingers, distances from wrists to bases of fingers, distances from wrists to tips of fingers, lengths of fingers, distances from tips of fingers to tips of fingers in the opposing hand, areas of palms, a chest circumference, a waist circumference, a high hip circumference, a maximum hip circumference, a lower hip circumference, circumferences of thighs, circumferences of biceps, circumferences of forearms, a head circumference, a neck circumference, a distance between shoulders, widths of feet, lengths of feet, distances from a seat of a chair to eyes when seated, and distances from a seat of a chair to hands with arms extended.

As just described, one class of derived measures includes determining the sizes, shapes, and/or masses of any anatomical component for which one or more images may be acquired, but with an insufficient number of viewing angles and/or detail to determine all structural elements. In these cases, normative anatomical features may be used to derive structural elements used within classification schemes. Additional examples of derived measurements that may help in classifications processes include body weight, body mass index, lengths of individual bones and other internal structures, reach, locations and sizes of movement pivot structures (e.g., shoulders, hips), lifting ability, center of gravity of an entire body and/or body components, and so on. If obscured by clothing or other objects, then locations and/or sizes of additional features such as genitals, breasts, nipples, buttocks and anus may be estimated. When computing such derived measures, it may be helpful mathematically to use different anatomical structures (e.g., shoulder, hip, ankle) as so-called "floating" references when computing or projecting (e.g., using principles of relatively simple levers) ranges of motion and/or lifting abilities.

In yet further embodiments, two or more individuals (with or without assistive devices) may perform collective acts that involve physical objects. The size, location, and/or proportions of such interactive objects may play a role in the abilities of the two or more individuals to collectively use or deploy the object(s). Objects may, for example, facilitate eating, rest, mobility, bodily functions, entertainment, and/or comfort while performing activities involving the two or more individuals. Examples of physical objects involved in such collective activities include one or more of a bed, wheelchair, walker, vehicle, chair, couch, stairs, sink, toilet, sex toy, robot, desk, table, platform, mirror, vanity, kitchen appliance, viewing screen, countertop, door and so on.

Physical dimensions and other properties of the interactive object(s) may play a role in the abilities of the two or more individuals to perform desired acts. In some cases, the physical location of an object (e.g., mirror, object within a confined space) may also play a role in its shared utility. Physical dimensions may be acquired based on one or more images of the object, physical measurements of the object and/or, in the case of identifiable manufactured objects, retrieved manufacturer's specifications. Classifications or assessments may also be made to determine whether physical acts may be performed using a given object at its current locations, and/or whether changes to the dimensions, location or other characteristics of an object may allow or optimize an ability of the two or more individuals to perform desired collective actions.

In further exemplary embodiments, direct and derived anthropometric measures may be used to assess the utility and/or effectiveness of assistive devices when assessing degrees to which two or more individuals may perform desired physical acts. Assistive devices may compensate for measured and/or projected (i.e., into the future) differences between the two or more individuals in one or more human features. Assistive devices may include, for example, one or more of a robot, platform, lifting (e.g., hydraulic or pulley) platform, adjustable position (e.g., tip-tilt) platform, weight (e.g., counter-weight), reach extender, adjustable bed, adjustable chair, adjustable desk, pillow, brace, walking support, elevator shoes, and adjustable or interchangeable toilet seat. Assistive devices may also enable two or more individuals to expand the diversity of their collective physical activities.

Examples of physical acts, actions, or activities that may be assessed based on direct and/or derived anthropometric measures include one or more of holding hands, spooning, kissing, hugging, comforting, sexual foreplay, sexual stimulation, performing sex that includes various positions and techniques (e.g., standing, missionary, riding, kneeling, lotus, sixty-nine), feeding each other, sitting on each other's lap, assisting during walking, assisting during climbing stairs, assisting during standing up, assisting getting into a bed, assisting getting out of a bed, assisting during use of a toilet, moving an occupied wheelchair, sitting together on a couch, sitting together on a chair, sitting together at a desk, and collectively operating a device.

In further exemplary embodiments, an assessment of future abilities to perform physical acts, action, or activities may be performed based on projecting measured anthropomorphic features forward in time to assess or predict: 1) whether performance of a collective act or activity will be possible at a selected future time, 2) an estimated time when the performance of a collective activity that may be possible at one time (e.g., currently) will no longer be possible, and/or 3) an estimated time when the performance of a collective activity that is not possible at one time (e.g., currently) becomes viable. Projected physical features of the two or more individuals may be estimated based on factors such as anticipated growth, a presence (or absence) of one or more medical conditions affecting overall growth and/or growth patterns, family history, and so on. Such projections of future abilities to perform collective activities may also take into account comfort levels, personal preferences for performing such activities, the use of assistive devices, modifications of any involved interactive objects, and so on.

For some anthropometric comparisons, only the relative sizes between two or more individuals may be required. However, for most comparisons and/or in order to make determinations of abilities based on performance databases and/or manufacturers' specifications of any objects or assistive devices involved with activities, absolute measures of anthropometric features may be required. Studios, in which distances from a camera to person may be controlled and camera characteristics are static (i.e., well-known), provide an accurate setting to make such anthropomorphic measurements.

Alternatively, modern day mobile devices with cameras provide a great deal of convenience when determining an object's size based on one or more acquired images. In this setting, some calibration may be required where, based on a camera image, the real size ($O_r$) of an object may be computed from $$O_r = \frac{O_d \times O_s}{F} \quad (1)$$

where $O_d$ is the distance from the camera to the object, $O_s$ is the size of the object on the camera sensor, and F is the real (i.e., not "equivalent", as sometimes specified for digital cameras) focal length.

Frequently, the focal length, F, of a camera's lens system may be specified in millimeters. In this case, the object size on the sensor, $O_s$, must also be expressed in millimeters (i.e., the same dimensional units). If the size of the sensor is known (e.g., based on camera specifications) along with the number of pixels on the sensor (e.g., within an image) occupied by the object, then the size of the object, $O_s$, may be converted from pixels to a linear distance by considering the fractional distance of the number of pixels occupied by the object compared to the overall number of pixels that make up the linear dimension of the sensor. Along similar lines, using equation 1, the real size of the object, $O_r$, is expressed in the same units as the measured distance from the camera to the object, $O_d$.

Alternatively or in addition, if an image contains an object of known size (for most cameras and lens systems, in any dimension or orientation), then this size may be used as a calibration or reference for other objects at a similar distance within images. Objects with a known size that might be used for calibration include a ruler, individual with a known height, identified coin (i.e., with known dimensions), identified mobile device (i.e., with known dimensions), and so on. If a camera is used initially with unknown specifications, then an image of an object with a known size may be used along with a measured distance to the object to determine, for example, the real focal distance of the camera, by a simple mathematical manipulation to isolate F with equation 1. Once known, F may subsequently be used with the same camera and equation 1 when distances or sizes of objects are not known.

Along similar lines, once the size (i.e., any linear dimension) of one or more objects within an image is known or determined, those one or more objects may be used as size references within subsequent and/or preceding images. If, for example, the height of an individual is determined within any image, then any other image taken by the same or a different camera may use that height as a reference. Within images, such references may be "transferred" to other objects within the same image. For example, if the overall height of an individual within an image is known, then that reference may be used to determine the size of the head (e.g., from ear to ear) or distance from knee to ankle of the same individual, an inanimate object at the same distance from the camera within the image, or a body part of a second individual within the image.

As a practical matter, computations and subsequent measures are easiest within images taken directly perpendicular to surfaces of measured individuals and/or objects. However, if images are taken at non-perpendicular angles (as long as within a range where image distortion is not an issue) compensations may be made mathematically by considering the optical geometry (e.g., light ray tracing) of the particular physical setup.

Comparisons of foundational and/or derived anthropomorphic features may include considering mathematical differences among two or more individuals (e.g., in reach), sums of features (e.g., combined weight) and/or any number of mathematical operations (e.g., body mass index is inversely proportional to the square of height). Mathematical comparisons among individuals, individual components, and/or objects may be linear (e.g., adjusting a table to accommodate for simple differences in height) or nonlinear (e.g., predicting catastrophic failure of a sofa when the combined weight of individuals exceeds the structural capacity of the sofa).

Within exemplary embodiments, classification schemes may be "binary" (e.g., producing a "yes" or "no" determination whether an act may be performed), or graded within segmented or continuous scales. Segmented scales may be described using terms such as "fully able, "likely able", "possible, but uncomfortable", "possible, but not within individuals' preferences", "physically impossible" and so on. Continuous scales, classifications of performance abilities within a spectrum may be expressed numerically, (e.g., as a percentage estimate, from fully able to unable to perform an act), color-coded, illustrated graphically (e.g., as a bar graph), and so on. In exemplary embodiments, the various classifications may additionally be tagged as "conditional" or dependent on certain factors, such as being able to perform an activity for a brief period of time (e.g., before tiring); only when absent symptoms of a particular medical condition, only when provided a medication, or only within a defined range of object characteristics (e.g., being able to push a wheelchair only if using a light-weight model and/or if handles are within a given height range), and so on.

In further embodiments, classifications may also include one or more confidence scores. Confidence in one or more assessments of abilities to collectively perform a desired action may be influenced, for example, by a degree to which anthropomorphic features are within a range for being able to perform the act, how far anthropomorphic features have been projected into the future, the degree to which an object (if involved) is within limitations for performing the action, the presence (or absence) of medical conditions, and/or an age range that might have a significant impact on physical abilities. As with collective activity classification outputs described above, confidence assessments may be described within discrete levels (e.g., an ability to perform an activity is "certain", "likely", "possible", "uncertain") or continuous spectrum (e.g., expressed numerically, as a percentage).

In exemplary embodiments, classification schemes may use one or more computational approaches including:
 1. one or more classifier neural networks trained by one or more human features databases labeled with abilities of two or more humans to collectively perform physical acts,
 2. statistical probabilities (e.g., using hyperspace and/or support vector machine classifications) based on one or more human features databases labelled with abilities of two or more humans to collectively perform physical acts, and
 3. directly acquired camera images as inputs to a neural network trained by a database of images of two or more humans labelled according to abilities of the two or more humans to perform physical acts.

Within these approaches, database element labelling (i.e., whether a given act or action is possible) may be accumulated using one or more methodologies including:
 1. ensuring that actions conform to the laws of physics (and physiology) where the performance of an activity may be compared with outputs of so-called "gaming engines" (known in the art) that animate human forms to obey such laws,
 2. based on "survey" results in which groups of two or more individuals (with similar anthropomorphic features and attributes such as age) are asked (e.g., via questionnaires, online surveys) whether they are able to perform activities and/or levels of comfort when they perform similar acts, and
 3. human performance databases where, as described in the Background section above, kinesiology and other medical disciplines study abilities of individuals to perform activities (particularly related to disability insurance, in workplace environments and during certain medical conditions).

In describing exemplary embodiments, it may be helpful to consider a relatively simple, well-defined activity in order to further explain key aspects of assessing, based on anthropometric measurements, an ability of two or more individuals to perform the activity. FIG. 1 shows a "teeter-totter," typically found in children's playgrounds, in which the action performed by two individuals 11a, 11b comprises rocking up and down on a rigid structure or beam 10 that pivots at a single support location 14a. The beam 10 makes up a class 1 lever where the fulcrum (i.e. pivot support) 12a is between the so-called effort and load (i.e., the two individuals).

In FIG. 1, the fulcrum 12a is shown at the midpoint 14a of the beam 10 and the two individuals are equidistant from the fulcrum. In this case, an "ideal" anthropometric reference for performing the activity of rocking up and down comprises two individuals of equal size and weight. Within the illustration shown in FIG. 1, based on measured dimensions, the leftmost individual 11a weighs less than the rightmost individual 11b. In this situation, the teeter-totter rocking activity may still be performed as long as the heavier individual 11b pushes off the ground 13b harder than the lighter individual 11a in order to compensate for increased weight.

However, at some magnitudes of one or more differences in direct (e.g., distance from crotch to ground) and/or derived (e.g., computed weight) anthropomorphic features, the activity may no longer be able to be performed. In the case of the teeter-totter activity, this occurs when the lighter individual 11a is no longer able to reach the ground 13a at any time while performing the teeter-totter activity.

In such cases, the activity and/or objects employed in the performance of the activity may be modified in order to compensate for such anthropometric differences and/or to make the activity comfortable for all involved. In the case of teeter-tottering, the heavier individual 11b may move 15 along the beam 10 to be closer to the fulcrum 12a (i.e., modifying the activity). Alternatively or in addition, the object's fulcrum 12a may be modified (or a different teeter-totter selected) from its mid-beam position 14a to a position 14b closer to the heavier individual (illustrated as a dashed-line fulcrum 12b in FIG. 1). Moving the fulcrum 12b is an example of modifying an object associated with a desired action to enable the activity. Such accommodations allow an activity to be performed despite differences in anthropomorphic features that would otherwise not allow the activity to occur.

Alternatively or in addition, one or more assistive devices may be included to facilitate performance of an activity. In the case of teeter-tottering, a mass 16 may be added to the beam on the side of the lighter individual 11a. In this case, either the weight and/or the position of the mass along the beam 10 may be adjusted to strive toward an "ideal" match between the two individuals. More specifically, the ideal condition for teeter-tottering is equal torque about a pivot location, taking into consideration all masses about the fulcrum, when the beam 10 is at a resting (i.e., horizontal) position.

If teeter-tottering cannot be performed due to anthropometric differences (e.g., involving a small child and a much larger adult), it may be possible to predict, based on projected growth by the two individuals, if and/or when the two individuals might be able to teeter-totter, with or absent assistive devices or object modifications. On the other hand, if the teeter-tottering activity can be performed, a prediction may alternatively be made to assess circumstances and/or times when it will no longer be possible to perform the activity based on anticipated growth of the individuals. In this case, compensating actions such as modifying the teeter-totter and/or the use of assistive devices (e.g., weights) may be considered to allow future use.

In summary, the simple operation of a teeter-totter exemplifies key aspects of assessing an ability of two or more individuals to perform an activity:

1. determining whether comparisons among one or more human anthropomorphic features are within ranges that allow the activity to be performed (e.g., difference in weight are within a range that allows the lighter individual to touch the ground at some time during the activity),
2. computing one or more "ideal" reference or target comparisons in one or more human anthropomorphic features (e.g., ideally, in order to teeter-totter with a fulcrum at the middle of the beam, weights and sizes of the two individuals are equal),
3. one or more modifications of activities may compensate for one or more differences in anatomical features (e.g., the heavier individual pushes sufficiently hard to allow the lighter individual to touch the ground),
4. even if comparisons are within a range that allows an activity to be performed, desirability or comfort level in performing the activity may be assessed (e.g., rapid pushing off the ground by the heavier individual may not allow the lighter individual to hang on),
5. preferences by the one or more individuals may dictate whether the physical activity may be performed in a mutually acceptable manner (e.g., even if the lighter individual is able to at least momentarily touch the ground, performance is largely controlled by the heavier individual, making the activity unenjoyable to the lighter individual),
6. one or more specifications of teeter-totter construction and/or its performance, coupled with user anthropometric measures, allows computations to assess abilities to perform activities (e.g., the height off the ground of the fulcrum determines if both individual can simultaneously reach the ground),
7. one or more modifications of an apparatus or object involved in performing the activity may enable the activity to be performed (e.g., changing the teeter-totter fulcrum may compensate for differences in size and/or weight of the two individuals),
8. adding one or more assistive components that may facilitate performance of activities (e.g., adding a weight to the teeter-totter on the side of the lighter individual),
9. projecting an ability to perform (or not perform) activities at some time in the future (e.g., if the lighter individual is a younger child, projecting growth of the child to a weight/height range and/or time when unassisted teeter-tottering may be performed), and
10. including a confidence level in assessments to perform activities (e.g., expressing certainty that growth of a child might reach levels sufficient to use the teeter-totter unaided, within a given time).

Figure 2:
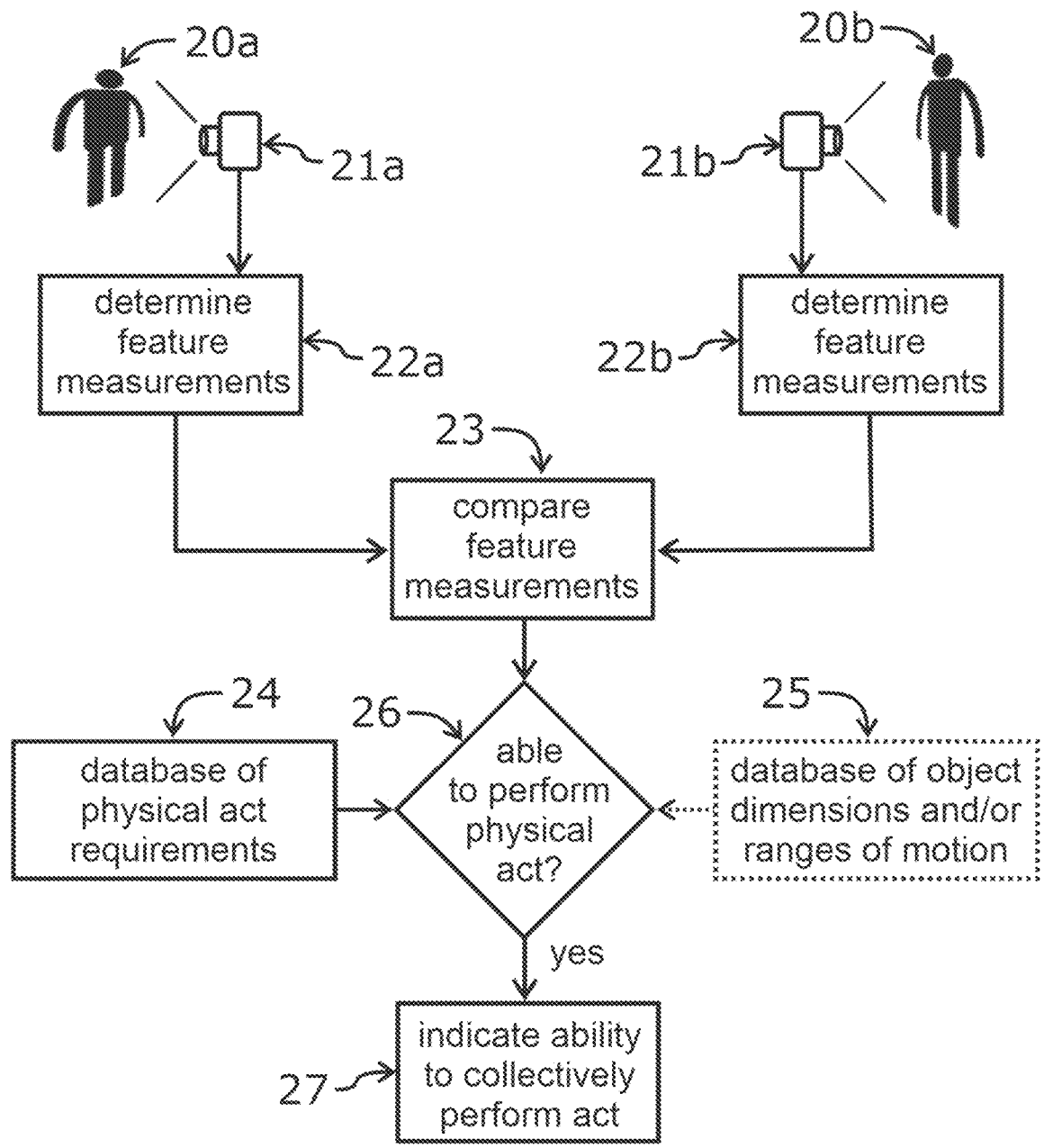
FIG. 2 is a flowchart showing steps to estimate whether two individuals are able to perform a collective physical act that may include interacting with an object or device.

FIG. 2 is a flow chart of elements of a process to classify or grade whether two individuals 20a, 20b can perform a desired act. A camera 21a is used to acquire one or more images of an individual (e.g., front view, side view(s), back view, top view, close-up views of features such as feet and hands). The same camera or a separate camera 21b may be used to acquire one or more similar images of a second individual 20b. The one or more cameras may have the capacity to operate in single-frame, burst-image and/or full video modes. Based on such images, comparisons are made at 23 of one or more directly measured (i.e., from images), derived (i.e., computed using information that includes image-based data), and/or otherwise known human features (e.g., information provided by the individual) and/or attributes (e.g., height, weight, age) determined at 22a and 22b.

Based on such comparisons 23, a machine-based assessment may be made at 26 to determine (e.g., yes or no) and/or grade (e.g., within a scale) whether the individuals 20a, 20b can collectively perform a desired physical act or activity. The assessment 26 may be made using one or more databases 24 of two or more individuals with known human features labelled according to their ability to perform identical or similar acts. Such databases may be used to assess such abilities based on directly measured and/or derived human features as inputs. Alternatively or in addition, given a desired physical act, such databases may be used to assess key human features that allow (or, alternatively, prohibit) such acts to be performed. One or both of the individuals 20a, 20b may be informed of their ability to collectively perform the desired act 27, confidence levels in such assessments, and/or physical requirements that may or may not be met.

Optionally (indicated by a dashed-line outline 25), such desired acts may involve the use of an object such as a bed, wheelchair, platform, and so on. In these cases, the physical dimensions, location, and/or other object features may play a role in the humans' ability to collectively perform a desired action. Object feature dimensions may be determined using a camera (i.e., using a process similar to acquiring human feature dimensions), acquired from direct physical measurements of the object (e.g., using a ruler, caliper, scale, tape measure), and/or based on an object manufacturer's specifications.

As with human features databases just described, such databases may be used based on identified objects with measured object features to assess whether identical or similar objects may be employed in conjunction with identical or similar human feature measurements. Alternatively or in addition, given a desired physical act, such databases may be used to assess key object features that allow (or, alternatively, prohibit) such acts to be performed.

Objects may also include one or more moving parts. Object feature dimensions may be determined based on moving such parts into one or more positions. Following such movements, object feature dimensions may be re-assessed using techniques similar to the camera-based methods just described. In other words, ranges of motion may be determined using one or more cameras (including video cameras to help isolate peak movements), acquired from direct physical measurements of the moved object component, and/or based on manufacturer's specifications.

Figure 3:
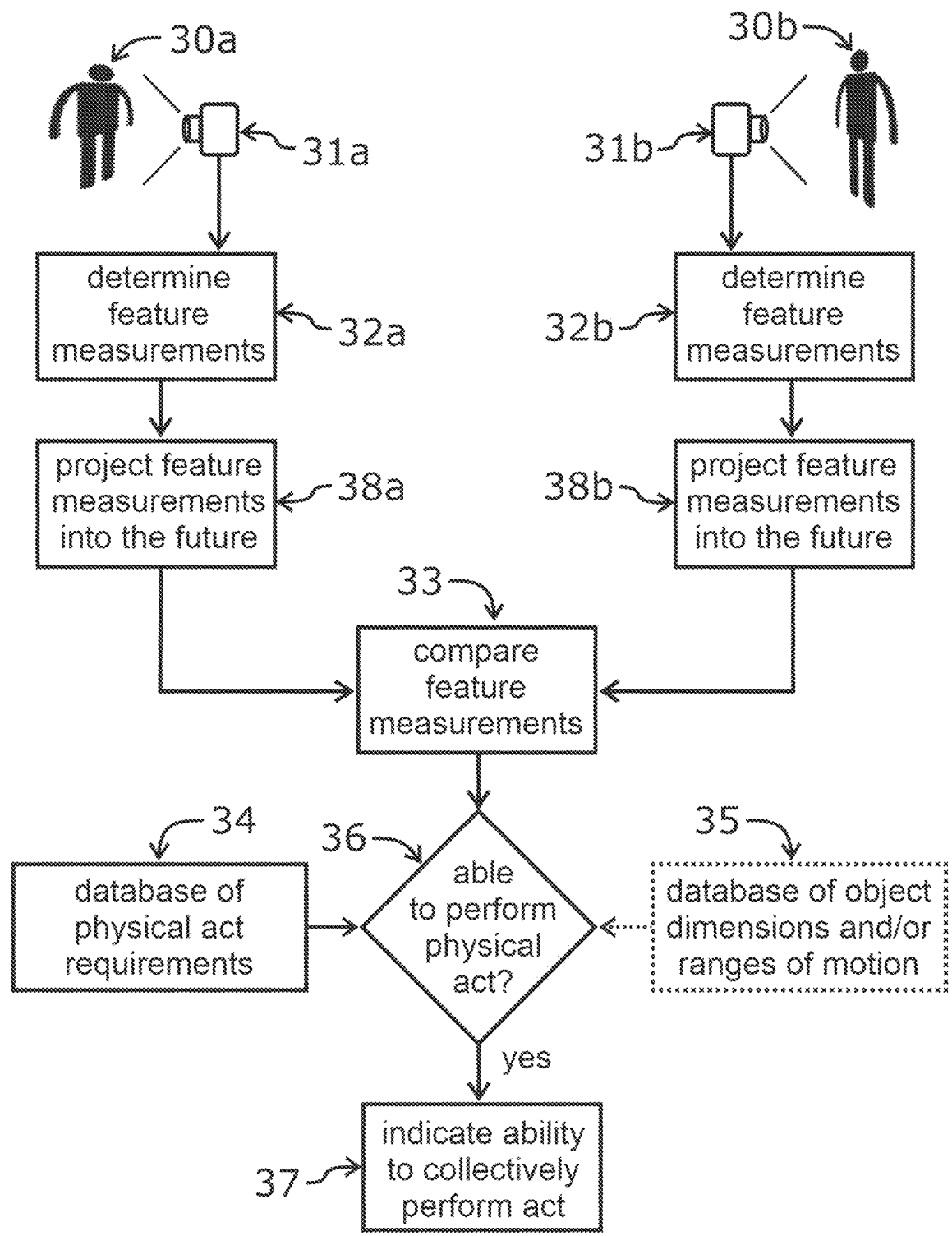
FIG. 3 is a flowchart illustrating steps to project whether two individuals will, in the future, be able to perform a collective physical act or activity that may include interacting with an object.

FIG. 3 illustrates key steps in determining whether two or more individuals 30a, 30b may (or may not) be able to collectively perform a desired act at some time in the future. Similar to the process described in association with FIG. 2, a camera 31a is used to take one or more images of an individual 30a, from which human feature measurements are determined at 32a. In a parallel manner, the same or a separate camera 31b may be used to take one or more images of a second individual 30a, from which a second set of human feature measurements are determined at 32b.

Both the feature measurements of the first individual 38a and the second individual 38b are then projected forward in time based on typical aging processes and any attributes known about each individual 30a, 30b along with normative databases of the effects of such human attributes on growth and development. Human attributes may include one or more of age, current level of physical activity, anticipated level of physical activity, one or more current anthropomorphic features, one or more past occupations, one or more current occupations, one or more past sports activities, one or more current sports activities, one or more hobbies, one or more genetic predispositions, one or more past disease conditions, one or more current disease conditions, one or more past medical treatments, one or more current medical treatments, history of smoking, anticipated level of smoking, past use of one or more drugs, current use of one or more drugs, one or more assessments of physical health, one or more disabilities, and one or more physiques of one or both parents.

Once both sets of feature measurements 38a, 38b are projected forward in time, key steps illustrated in FIG. 3 are similar to those illustrated in FIG. 2. Comparisons are made of projected human feature measurements at 33. At 32, one or more databases of humans with differences in human feature measurements similar to those projected into the future labelled with abilities to perform various acts are used within classification schemes (e.g., neural net, hyperspace, support vector machine) to determine abilities of the two individuals 30a, 30b, to perform desired acts in the future at 36. If desired, for acts that involve one or more objects, one or more databases of object measurements and/or ranges of motion may be included within assessments to grade abilities to perform acts that involve objects. Optionally, a confidence score (as described above) may be included along with each predicted assessment.

Determinations whether acts that involve interactions with an object may be conveyed at 37 to the individuals 30a, 30b (and/or others) who, in turn, may assess: 1) whether they remain together to perform the activity, 2) whether to retain an object that may or may not be functional for the individuals collectively in the future, 3) whether an assistive device might allow one or more collective activities involving the object to be performed, or 4) whether to acquire a desired object and, if so, knowing an operable range and/or ideal dimensions for such a purchase or acquisition.

Figure 4A:
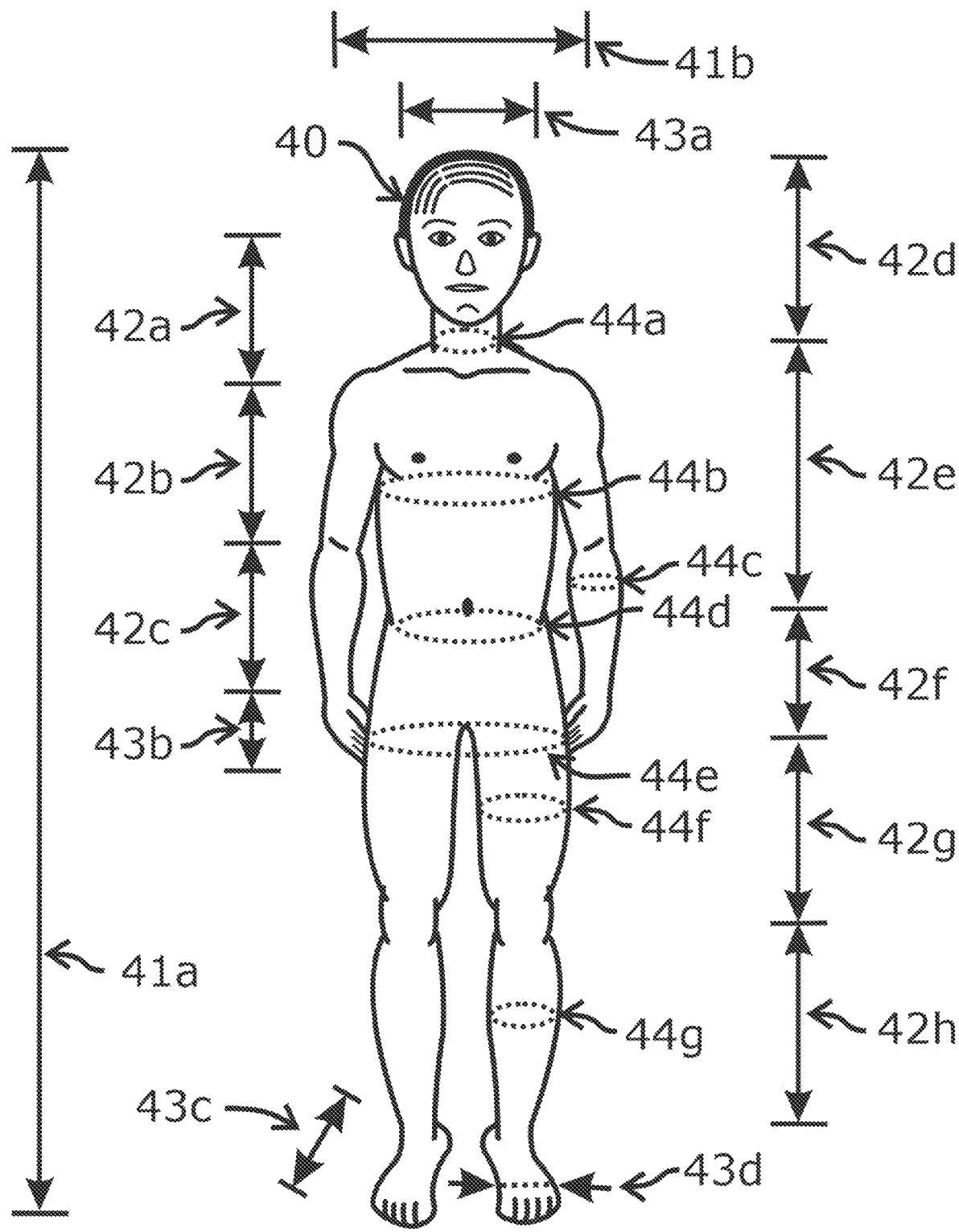
FIG. 4A illustrates exemplary anthropometric measurements that may be determined from an individual with predominantly male anatomical features.
Figure 4B:
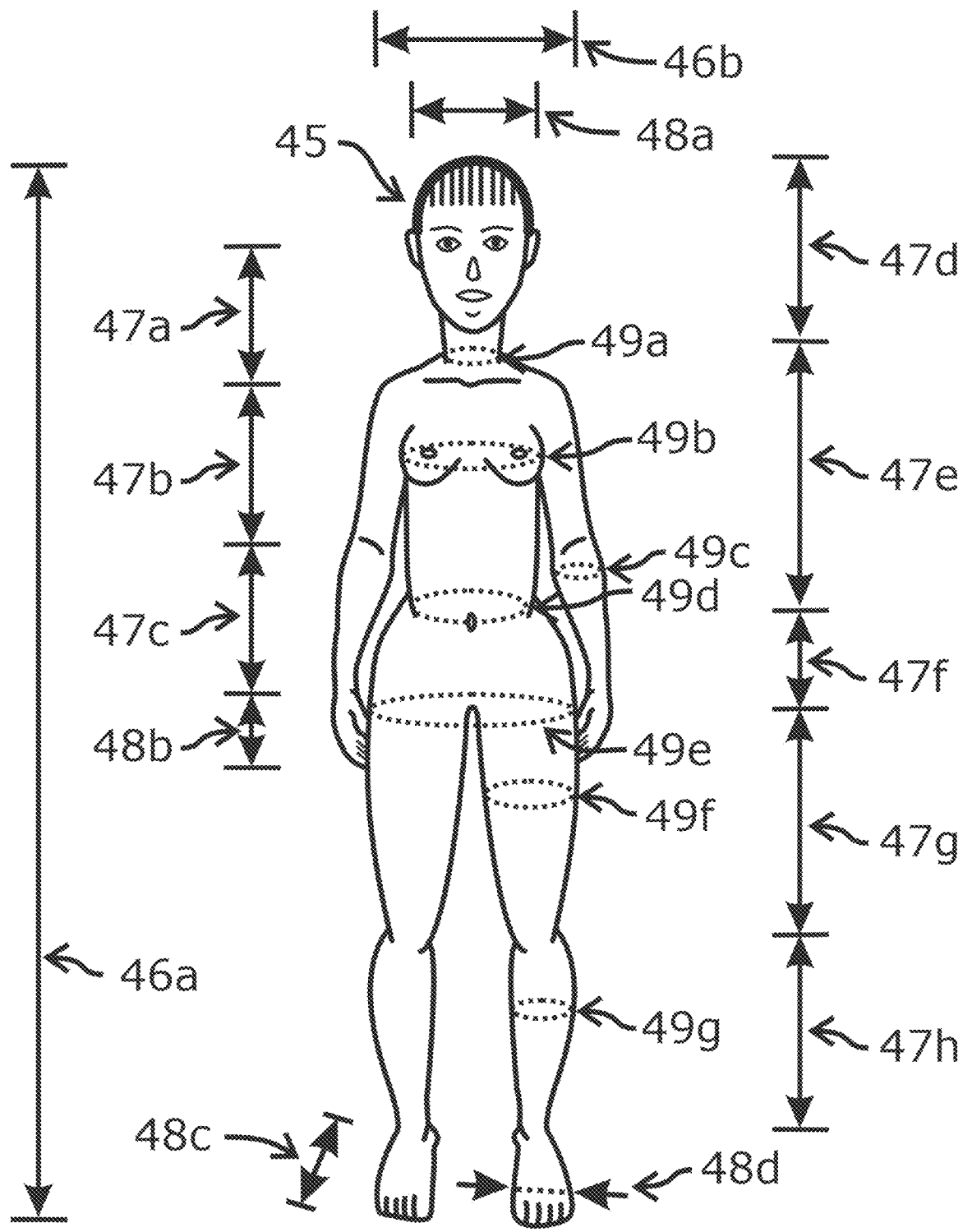
FIG. 4B illustrates exemplary anthropometric measurements that may be determined from an individual with predominantly female anatomical features.

FIGS. 4A and 4B illustrate exemplary anthropometric measurements that may be determined based on one or more camera images of two or more individuals. Based on personal preferences and desired accuracy, any number of images may be acquired (e.g., front, top, and side views), from any distances (e.g., closer, more detailed views for areas such as the face, hands and feet), and with any degree of clothing (where thick clothing may produce less accurate measures).

FIG. 4A demonstrates some of the measures that may be acquired from a frontal plane view of a male body type 40. Starting with gross anatomy (working toward more detailed measures) overall body height 41a and shoulder width 41b may generally be assessed readily from such views. The dimensions of different body segments 42a, 42b, 42c, 42d, 42e, 42f, 42g, 42h may be assessed generally using locations of joints, transitions and other identifiable features within images. In some cases, it may be convenient to view different poses, for example, with joints viewed in different rotational positions to more accurately assess pivot points.

Examples of such body segments include eyes-to-shoulder distance 42a, shoulder-to-elbow distance 42b (e.g., from which the length of the humerus bone, and bicep and tricep muscles may be estimated), elbow-to-wrist distance 42c (e.g., from which the length of the ulna and radius bones and forearm muscles may be estimated), distance from the top of the head to the base of the neck 42d, torso (i.e., neck-to-waist) height 42e, distance from the waist to maximum hip diameter 42f, hip-to-knee distance 42g (e.g., from which the length of the femur may be estimated), and knee-to-ankle distance 42h (from which the length of the tibia may be estimated).

Such camera-based images may also be used to estimate overall sizes of various body parts. For example, the sizes of the head 43a, hands 43b, and feet 43c, 43d may be determined (optimally based on more close-up views). If only a single view of such body parts is available, then the overall size may be estimated based on typical morphological shapes (i.e., based on databases of anatomical structures) that may be adjusted to account for various human attributes such as gender, ethnicity and/or age, if known. If multiple views (e.g., front, side, top) are available, then body part size may be estimated based on directly measured distances in multiple dimensions. For example, the size of feet may be more accurately described (i.e., compared with a single measure) by measuring both the length 43c and width 43d of one or both feet.

Other body features may be conveniently described by one or more diameters or radii (e.g., two radii may be used to define an elliptical cross-section) and/or circumferences at reference body locations 44a, 44b, 44c, 44d, 44e, 44f, 44g. For example, the circumference of the base of the neck 44a, chest 44b, forearm 44c, waist 44d, hip girth 44e, thigh 44f, and calf 44g may each be estimated based on a single (e.g., frontal) image or multiple (e.g., frontal and side) images.

FIG. 4B demonstrates some of the measures that may be acquired from a frontal plane view of a female body type 45. In exemplary embodiments, if anthropomorphic features are determined from two or more individuals involving differing genders, then anticipated (e.g., not measured directly) dimensions of features, projected changes in feature dimensions over time, and assessments of abilities to perform physical acts may take into account sexual dimorphisms. Differences in features between male and female individuals, as well as their abilities to perform activities, may be compared taking into account extensive studies of gender differences including within various ethnicities and age groups. A number of derived measures used clinically in assessments of overall health and abilities to perform specific activities (e.g., ratios of circumferences of chest-to-waist, upper arm-to-forearm, upper arm-to-thigh, thigh-to-calf) may be used to help take into account such gender differences.

As examples, adult American males are, on average, about fifteen centimeters (15 cm) (i.e., 9%) taller than corresponding females. Male upper body strength for this group (with an average of twelve kilograms (12 kg) greater skeletal muscle mass) is, on average, 40% greater than females and approximately 33% greater within the lower body. Male horizontal reach (i.e., fingertip to fingertip) is 12% greater and vertical reach (i.e., from the floor) averages 8% greater. Younger females are generally more flexible than their male counterparts where most measures of flexibility show a steady decrease (in both genders) with age. Similar to FIG. 4A, body height 46a and shoulder width 46b (where, on average, male shoulder width is approximately 12% greater) may more readily be determined based on more distant camera views.

Taking into account sexual dimorphisms may also be included in measures of body segments including eyes-to-shoulder distance 47a, shoulder-to-elbow distance 47b, elbow-to-wrist distance 47c, distance from the top of the head to the base of the neck 47d (male necks average 11% longer), torso height 47e, distance from the waist to maximum hip diameter 47f, hip-to-knee distance 47g, and knee-to-ankle distance 47h, neck circumference 49a (male neck girth averages 18% greater), chest circumference, 49b, forearm circumference 49c, waist circumference 49d, hip circumference, 49e, thigh circumference, 49f, and calf circumference 49g. Male-to-female differences may also be compared among various body parts including head 48a (male circumference averaging 4% greater), hands 48b (male length and breadth approximately 12% larger), and feet 48c, 48d (average male foot lengths are consistently larger but with wide ethnic diversity).

Changes in proportions in body size are also apparent within images of physiques at different ages. Relative (i.e., to other parts of the body) proportions of an infant's head (of either gender) progressively decreases through life. Lengths of legs progressively increase throughout life whereas the height of a torso may, on average, decrease somewhat in later years. Overall muscle mass (particularly in males) also decreases in the elderly.

Figure 5A:
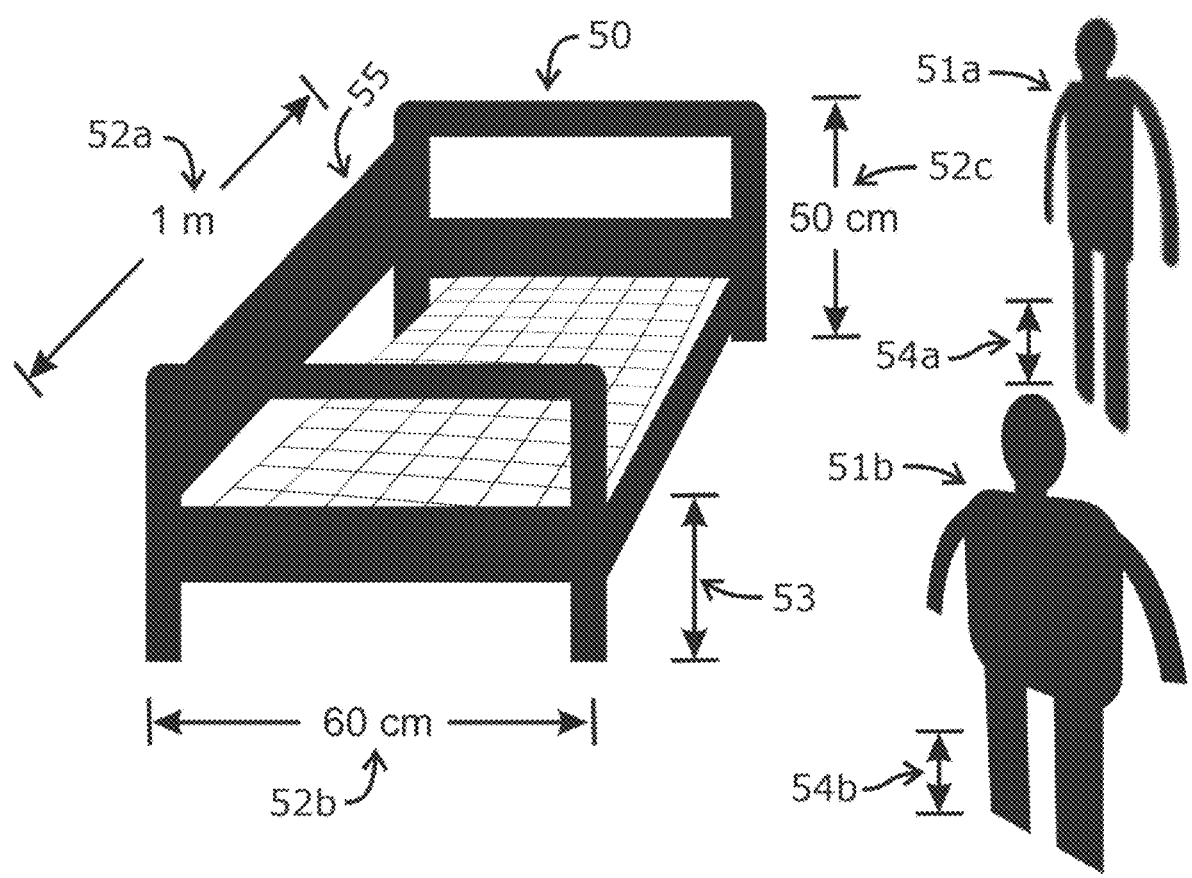
FIG. 5A illustrates a process of assessing the abilities of two or more individuals to perform a collective action (i.e., sitting together) involving an object (i.e., a bench or loveseat) with measured dimensions.

FIG. 5A illustrates a scenario in which anthropometric data from two individuals 51a, 51b may be used to assess their ability to comfortably sit together (i.e., collectively) on a bench or loveseat 50 with known specifications (e.g., 52a, 52b, 52c, 53). In this scenario, the anthropometric data of the two individuals 51a, 51b may be known based on images gathered using a camera (not shown). For example, the maximum widths of hips of the two individuals 51a, 51b may be compared to the width of the bench 52a to determine whether seating is possible at all (unless they sit in each other's lap).

Dimensions 52a, 52b, 52c, 53 of the bench 50 may be known based on one or more images of the bench 50, measurement acquired using (for example) a tape measure, and/or specifications provided by the manufacturer or distributor of the bench 50. These dimensions may include overall measures of the object including width 52a, depth 52b and height 52c. Physical dimensions may also include measures of components or subsets of objects such as a distance from the seat of the bench to the ground 53. Distances from the individuals' knees to the ground 54a, 54b compared to seat height 53 may be used to predict if sitting might be comfortable for both individuals 51a, 51b based on seat height 53.

Figure 5B:
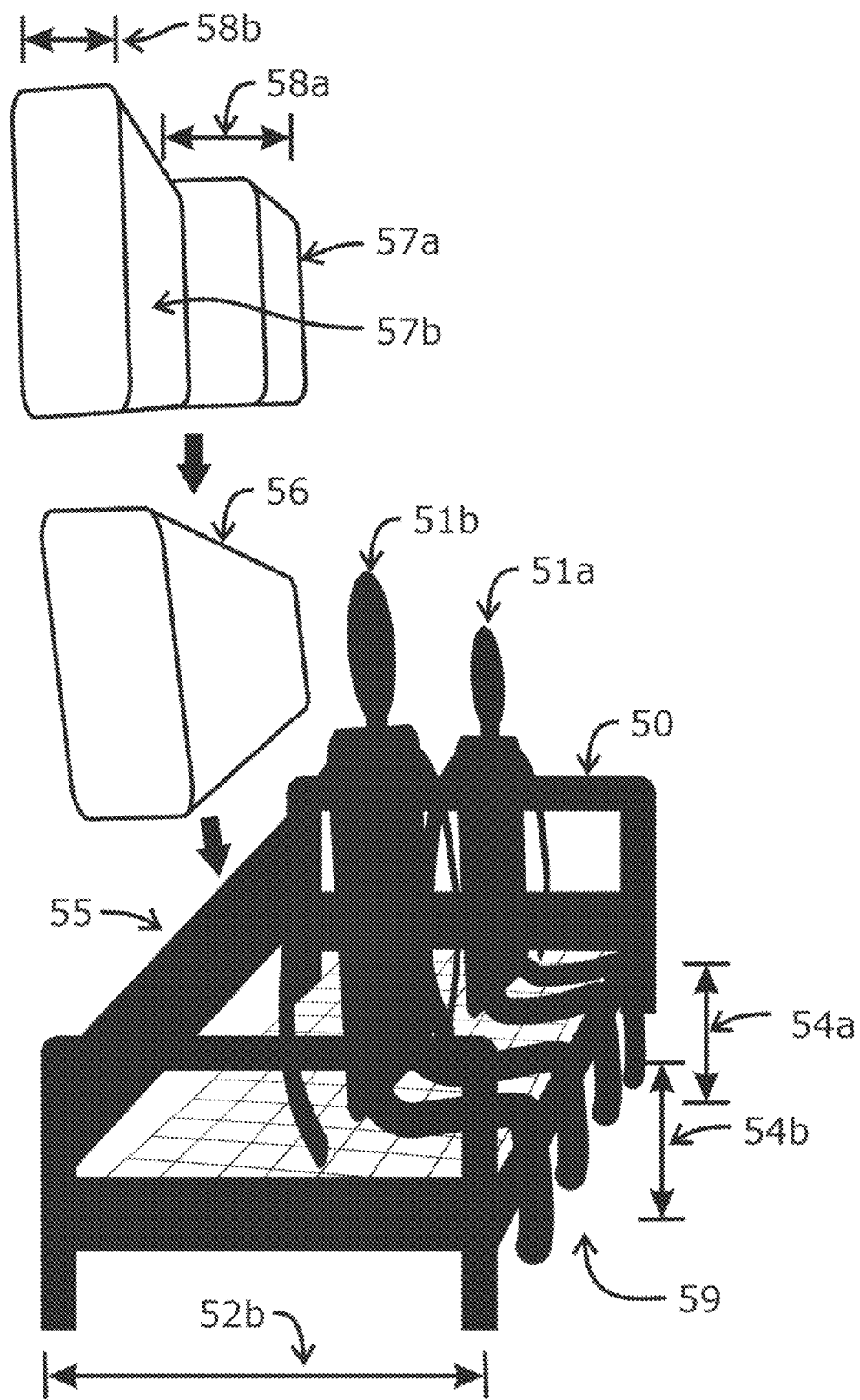
FIG. 5B follows on from the scenario illustrated in FIG. 5A, demonstrating how anthropomorphic features may dictate whether and, based on preferences including the use of one or more pillows, how comfortably the two individuals might sit on the bench.

FIG. 5B continues the scenario illustrated in FIG. 5A showing the two individuals 51a, 51b performing the act of sitting on the bench 50. The bench 50 shown was assessed to be sufficiently wide to accommodate the collective physical widths of both individuals 51a, 51b. An assessment may then consider whether the feet of the two individuals 51a, 51b comfortably reach the ground 59 based on seat height 53 and distances from knees to ground for both individuals (i.e., 54a for individual 51a, and 54b for individual 51b).

Additionally within this scenario, an assistive device (i.e., one or more pillows 56, 57a, 57b) may be used to fill the gap between the back of the bench 55 and the positions of the two individuals 51a, 51b given the depth of the bench 52b. Based on anthropometric differences between the two individuals 51a, 51b and taking into consideration personal preferences, back support may be provided by a single pillow with a uniform thickness 56, or (if preferred) by a pair of pillows 57a, 57b in which thicknesses have been selected to compensate for anatomical differences between the individuals 51a, 51b.

Figure 6:
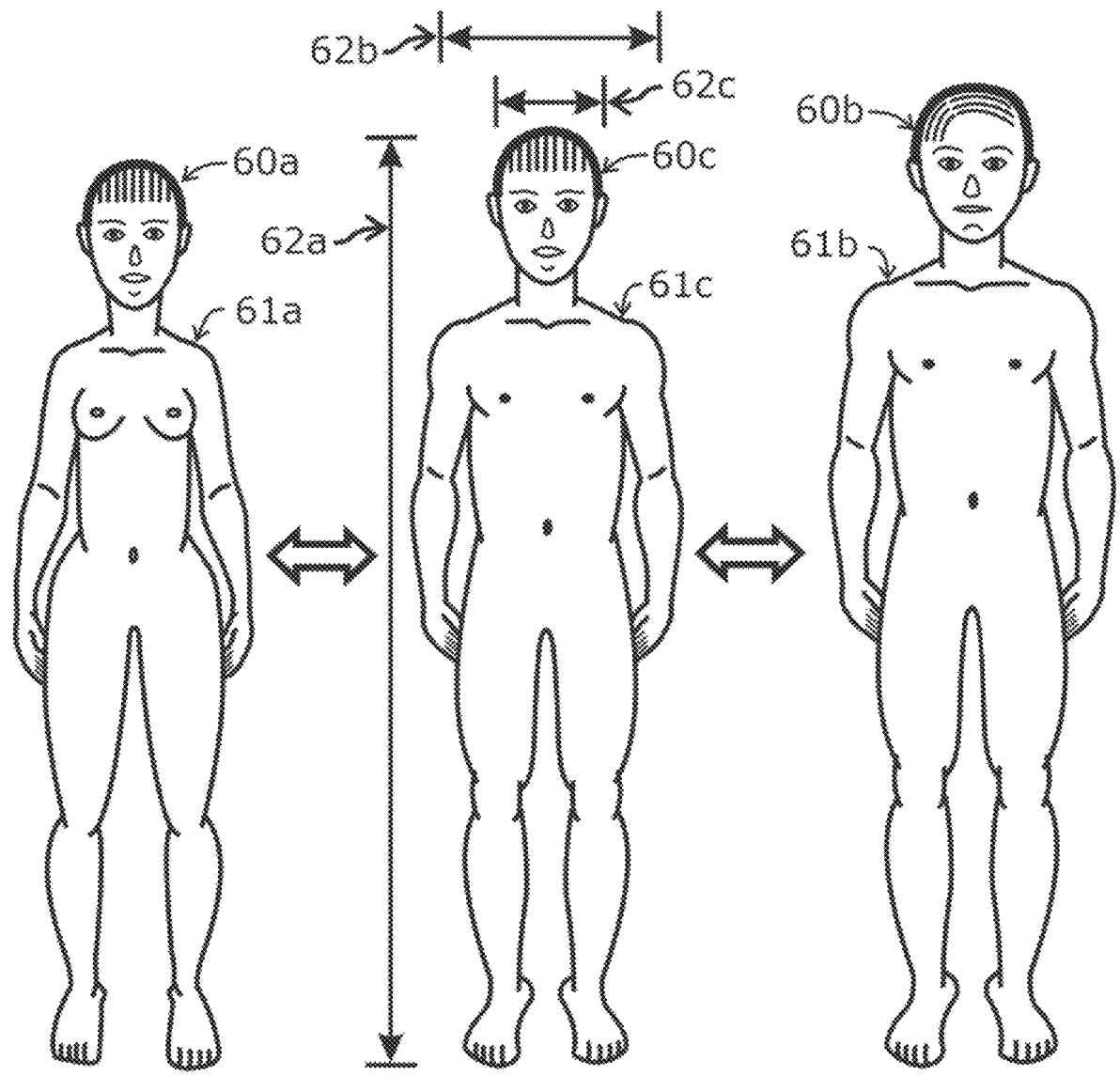
FIG. 6 illustrates how the combined anthropomorphic features of two or more individuals may be used to develop a composite or hybrid virtual body with current (or anticipated, future) anthropomorphic features that resemble and/or interface between the two or more individuals.

FIG. 6 illustrates the formation of a virtual character or third person avatar (comprising a head 60c and body 61c) derived from anthropomorphic features of two or more individuals (each comprising heads 60a, 60b and bodies 61a, 61b). In broad terms within exemplary embodiments, individual anthropomorphic features of the intermediary virtual character may appear 1) sized between (or at least based on individual features, where caricature features may, for example, appear oversized) the anthropomorphic features of the two or more individuals, and/or 2) "mixed and matched," using collections of individual anthropomorphic features extracted from the two or more individuals. Optionally, sized anatomical features of other individuals may also be included.

FIG. 6 illustrates the use of both combinations. The overall size including the height 62a and width 62b of the virtual body form shown in the middle portion of FIG. 6 is between that of the female form shown to the left 60a, 61a and the male form shown to the right 60b, 61b. The virtual form is composed of a head exclusively with features based on the female form 60c and a body based on male features 61c. Due to sexual dimorphism of body features described above (particularly in association with FIG. 4B), the size of the virtual female head 62c may be separately adjusted (slightly) to produce a more typical appearance within the virtual body 61c.

Such virtual characters 60c, 61c may be used to collectively represent the two or more individuals from which the anthropomorphic features were derived. Collective, virtual characters may, for example, represent couples and/or groups of individuals within games, video conferencing, household presentations, and other forms of interaction within the digital world. In additional exemplary embodiments, coupled and/or other groups of individuals may gauge the appearances of various body forms with different combinations of features based on themselves, genetically related relatives, acquaintances, celebrities, and/or others. Anthropomorphic features may also be based on projections of the various body forms at a different time (i.e., at an earlier or later age).

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method to assess physical compatibility between two or more humans, comprising:
   acquiring, using one or more cameras and one or more processors, one or more first images of a first human;
   determining, from the one or more first images and using the one or more processors, one or more first human feature measurements;
   acquiring, using the one or more cameras and the one or more processors, one or more second images of a second human;
   determining, from the one or more second images and using the one or more processors, one or more second human feature measurements; and
   classifying, from comparisons between the one or more first human feature measurements and the one or more second human feature measurements and using the one or more processors, a collective ability of the first human and the second human to perform a physical act.

2. The method of claim 1, wherein the one or more human feature measurements comprise one or more of an overall body height, distances from hands to ground, distances from a crotch to ground, distances from a crotch to knees, distances from a crotch to eyes, distances from eyes to a nose, distances from a crotch to breasts, a bust circumference, distances from knees to ground, distances from knees to ankles, distances from hips to knees, distances from shoulders to elbows, distances from elbows to wrists, a torso length, distances from eyes to a mouth, circumferences of hands, circumferences of wrists, circumferences of fingers, distances from wrists to bases of fingers, distances from wrists to tips of fingers, lengths of fingers, distances from tips of fingers to tips of fingers in the opposing hand, areas of palms, a chest circumference, a waist circumference, a high hip circumference, a maximum hip circumference, a lower hip circumference, circumferences of thighs, circumferences of biceps, circumferences of forearms, a head circumference, a neck circumference, a distance between shoulders, widths of feet, lengths of feet, distances from a seat of a chair to eyes when seated, and distances from a seat of a chair to hands with arms extended.

3. The method of claim 1, wherein the physical act comprises one or more of holding hands, spooning, kissing, hugging, comforting, sexual foreplay, sexual stimulation, performing sex, feeding each other, sitting on each other's lap, assisting during walking, assisting during climbing stairs, assisting during standing up, assisting getting into a bed, assisting getting out of a bed, assisting during use of a toilet, moving a wheelchair occupied by the first human, sitting together on a couch, sitting together on a chair, sitting together at a desk, and collectively operating a device.

4. The method of claim 1, wherein classifying, based on comparisons among the one or more first human feature measurements, the one or more second human feature measurements and one or more additional human feature measurements using the one or more processors, a group ability to collectively perform the physical act comprises:
   acquiring, using the one or more cameras and the one or more processors, one or more additional images of an additional human; and
   computing, from the one or more additional images using the one or more processors, the one or more additional human feature measurements.

5. The method of claim 1, wherein classifying the collective ability of the first human and the second human to perform the physical act comprises one or more of:
   using one or more classifier neural networks trained by a human features database labeled with abilities of two or more humans to collectively perform physical acts;
   using statistical probabilities based on a human features database labelled with abilities of two or more humans to collectively perform physical acts; and
   using the one or more first images and the one or more second images as inputs to a neural network trained by a database of images of two or more humans labelled according to abilities of the two or more humans to perform physical acts.

6. The method of claim 1, wherein the ability to collectively perform the physical act is augmented by one or more assistive devices designed to compensate for the one or more comparisons between the one or more first human feature measurements and the one or more second human feature measurements.

7. The method of claim 6, wherein the one or more assistive devises comprise one or more of a robot, a platform, a lifting platform, an adjustable position platform, one or more weights, one or more reach extenders, an adjustable bed, an adjustable chair, an adjustable desk, one or more pillows, one or more braces, a walking support, elevator shoes, and a changeable toilet seat.

8. A method to assess future physical compatibility between two or more humans, comprising:
   acquiring, using one or more cameras and one or more processors, one or more first images of a first human;
   determining, from the one or more first images and using the one or more processors, one or more first human feature measurements;
   computing, using the one or more first human feature measurements and first human attributes and using the one or more processors, one or more future first human feature measurements;
   acquiring, using the one or more cameras and the one or more processors, one or more second images of a second human;
   determining, from the one or more second images and using the one or more processors, one or more second human feature measurements;
   computing, using the one or more second human feature measurements and second human attributes and using the one or more processors, one or more future second human feature measurements; and
   classifying, from comparisons between the one or more future first human feature measurements and the one or more future second human feature measurements and using the one or more processors, a future collective ability of the first human and the second human to perform a physical act.

9. The method of claim 8, wherein the one or more human feature measurements comprise one or more of an overall body height, distances from hands to ground, distances from a crotch to ground, distances from a crotch to knees, distances from a crotch to eyes, distances from eyes to a nose, distances from a crotch to breasts, a bust circumference, distances from knees to ground, distances from knees to ankles, distances from hips to knees, distances from shoulders to elbows, distances from elbows to wrists, a torso length, distances from eyes to a mouth, circumferences of hands, circumferences of wrists, circumferences of fingers, distances from wrists to bases of fingers, distances from wrists to tips of fingers, lengths of fingers, distances from tips of fingers to tips of fingers in the opposing hand, areas of palms, a chest circumference, a waist circumference, a high hip circumference, a maximum hip circumference, a lower hip circumference, circumferences of thighs, circumferences of biceps, circumferences of forearms, a head circumference, a neck circumference, a distance between shoulders, widths of feet, lengths of feet, distances from a seat of a chair to eyes when seated, and distances from a seat of a chair to hands with arms extended.

10. The method of claim 8, wherein the physical act comprises one or more of holding hands, spooning, kissing, hugging, comforting, sexual foreplay, sexual stimulation, performing sex, feeding each other, sitting on each other's lap, assisting during walking, assisting during climbing stairs, assisting during standing up, assisting getting into a bed, assisting getting out of a bed, assisting during use of a toilet, moving a wheelchair occupied by the first human, sitting together on a couch, sitting together on a chair, sitting together at a desk, and collectively operating a device.

11. The method of claim 8, wherein classifying, based on comparisons among the one or more first human feature measurements, the one or more second human feature measurements and one or more additional human feature measurements using the one or more processors, a future group ability to collectively perform the physical act comprises:
    acquiring, using the one or more cameras and the one or more processors, one or more additional images of an additional human;
    computing, from the one or more additional images and using the one or more processors, the one or more additional human feature measurements; and
    computing, from the one or more additional human feature measurements and additional human attributes using the one or more processors, one or more future additional human feature measurements.

12. The method of claim 8, wherein the one or more human attributes comprise one or more of age, current level of physical activity, anticipated level of physical activity, one or more current anthropomorphic features, one or more past occupations, one or more current occupations, one or more past sports activities, one or more current sports activities, one or more hobbies, one or more genetic predispositions, one or more past disease conditions, one or more current disease conditions, one or more past medical treatments, one or more current medical treatments, history of smoking, anticipated level of smoking, past use of one or more drugs, current use of one or more drugs, one or more assessments of physical health, one or more disabilities, and one or more physiques of one or both parents.

13. The method of claim 8, wherein the ability to collectively perform the physical act is augmented by one or more assistive devices designed to compensate for the one or more comparisons between the one or more first human feature measurements and the one or more second human feature measurements.

14. A method to assess physical compatibility between two or more humans and an object, comprising:
    acquiring, using one or more cameras and one or more processors, one or more first images of a first human;
    determining, from the one or more first images and using the one or more processors, one or more first human feature measurements;
    acquiring, using the one or more cameras and the one or more processors, one or more second images of a second human;
    determining, from the one or more second images and using the one or more processors, one or more second human feature measurements;
    computing, from the one or more first human feature measurements and the one or more second human feature measurements and using the one or more processors, combined human feature measurements; and
    classifying, from comparisons among the combined human feature measurements and one or more databases of feature measurements of an object and using the one or more processors, a collective ability of the first human and the second human to perform a physical act involving the object.

15. The method of claim 14, wherein the one or more human feature measurements comprise one or more of an overall body height, distances from hands to ground, distances from a crotch to ground, distances from a crotch to knees, distances from a crotch to eyes, distances from eyes to a nose, distances from a crotch to breasts, a bust circumference, distances from knees to ground, distances from knees to ankles, distances from hips to knees, distances from shoulders to elbows, distances from elbows to wrists, a torso length, distances from eyes to a mouth, circumferences of hands, circumferences of wrists, circumferences of fingers, distances from wrists to bases of fingers, distances from wrists to tips of fingers, lengths of fingers, distances from tips of fingers to tips of fingers in the opposing hand, areas of palms, a chest circumference, a waist circumference, a high hip circumference, a maximum hip circumference, a lower hip circumference, circumferences of thighs, circumferences of biceps, circumferences of forearms, a head circumference, a neck circumference, a distance between shoulders, widths of feet, lengths of feet, distances from a seat of a chair to eyes when seated, and distances from a seat of a chair to hands with arms extended.

16. The method of claim 14, wherein the object comprises one or more of a bed, a wheelchair, a walker, a vehicle, a chair, a couch, stairs, a toilet, a sex toy, a robot, a desk, a table, a platform, a mirror, a vanity, a kitchen appliance, a viewing screen, a countertop and a door.

17. The method of claim 14, wherein determining the object feature measurements comprises one or more of:
    acquiring, using the one or more cameras, one or more third images of an object, and computing using the one or more processors, from the one or more third images, one or more object feature measurements;
    acquiring, from direct physical measurements of the object, one or more object feature measurements; and
    determining, from an object manufacturer's specifications, one or more object feature measurements.

18. The method of claim 14, wherein classifying, based on comparisons between group combined human feature measurements and the object feature measurements using the one or more processors, a group ability to collectively perform the physical act comprises:
    acquiring, using the one or more cameras and the one or more processors, one or more additional images of an additional human;
    determining, from the one or more additional images and using the one or more processors, the one or more additional human feature measurements; and computing, from the one or more first human feature measurements, the one or more second human feature measurements and the one or more additional human feature measurements and using the one or more processors, the group combined human feature measurements.

19. The method of claim 14, wherein the one or more databases of object feature measurements include one or more moved object feature measurements following movement of one or more components of the object.

20. The method of claim 19, wherein determining the one or more moved object feature measurements comprises one or more of:
   acquiring, using the one or more cameras, one or more third images of the object following movement of the one or more components of the object, and determining using the one or more processors, from the one or more third images, the one or more moved object feature measurements;
   determining, from direct physical measurements of the object following movement of the one or more components of the object, the one or more moved object feature measurements; and
   determining, from an object manufacturer's specifications, the one or more moved object feature measurements.

* * * * *